(12) United States Patent
Kito

(10) Patent No.: US 7,273,042 B2
(45) Date of Patent: Sep. 25, 2007

(54) FUEL VENT VALVE

(75) Inventor: Hiroaki Kito, Nishikasugai-gun (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 169 days.

(21) Appl. No.: 11/153,375

(22) Filed: Jun. 16, 2005

(65) Prior Publication Data

US 2005/0284875 A1 Dec. 29, 2005

(30) Foreign Application Priority Data

Jun. 24, 2004 (JP) ............... 2004-186299

(51) Int. Cl.
*F02M 37/20* (2006.01)
*F02M 37/00* (2006.01)

(52) U.S. Cl. .................... 123/516; 123/518

(58) Field of Classification Search ............. 123/516, 123/518, 519, 520, 198 D; 137/43, 202, 137/587
See application file for complete search history.

(56) References Cited

U.S. PATENT DOCUMENTS

| | | | | |
|---|---|---|---|---|
| 5,518,018 A | * | 5/1996 | Roetker | 137/43 |
| 5,566,705 A | * | 10/1996 | Harris | 137/43 |
| 5,590,697 A | | 1/1997 | Benjey et al. | |
| 5,836,341 A | * | 11/1998 | Ayers et al. | 137/202 |
| 6,085,771 A | | 7/2000 | Benjey et al. | |
| 6,561,211 B2 | * | 5/2003 | Devall | 137/202 |
| 6,779,545 B2 | * | 8/2004 | Hattori | 137/202 |
| 7,013,908 B2 | * | 3/2006 | Miyoshi et al. | 137/202 |
| 2004/0211465 A1 | * | 10/2004 | Miyoshi et al. | 137/202 |
| 2005/0087227 A1 | * | 4/2005 | Powell et al. | 137/202 |

* cited by examiner

*Primary Examiner*—Mahmoud Gimie
(74) *Attorney, Agent, or Firm*—Posz Law Group, PLC

(57) ABSTRACT

A fuel vent valve is not shut improperly by the flow of fuel vapor. The fuel vent valve also prevents fuel from spilling out from filler neck during filling of a fuel tank. The fuel vent valve includes a casing having a vent space, a float and a vent device which can be moved up and down. The vent device includes an upper valve member, which shuts and opens a communication passage. The upper valve member is located above the float. A breathing hole and an outer wall of the valve device form a restricted passage. When the fuel level reaches a first predetermined level and the valve device rises, the restricted passage increases the flow resistance to restrict the flow of fuel vapor from the communication passage to the outside of the fuel tank. When fuel level reaches a second predetermined level and the valve device rises further, the upper valve member closes the communication passage.

16 Claims, 5 Drawing Sheets

US 7,273,042 B2

FUEL VENT VALVE

CROSS REFERENCE TO RELATED APPLICATION

This application is based on and incorporates by reference Japanese Patent Application No. 2004-186299, which was filed on Jun. 24, 2004.

BACKGROUND OF THE INVENTION

The present invention relates to a fuel vent valve located on the upper portion of a fuel tank. The fuel vent valve includes a communication passage through which fuel vapor from inside the tank is allowed to pass. In particular, the present invention relates to the fuel vent valve providing a function that prevents fuel from spilling out from a filler neck.

A typical fuel vent valve includes a casing body, which includes a valve chamber and a communication passage extending between the inside and outside of the fuel tank, a float, which is located in the valve chamber and moved up and down in response to the fuel level in the fuel tank, and an upper valve member located above the float.

The typical fuel vent valve is closed in two steps in response to a rising fuel level when the fuel tank is filled. The two step valve closing prevents the pressure of the fuel tank from increasing suddenly. Thus, fuel over-flow or spilling at the fill opening is prevented.

If the upper valve member in such a valve is pushed up by a flow of fuel vapor and closes the communication passage when fuel vapor flows strongly from the fuel tank toward the communication passage through the valve chamber, then fuel over-flow cannot be prevented. Also, the load of the upper valve member is set according to the modulus of elasticity of a spring or rubber member, therefore, there are many processes involved in setting up and assembling the upper valve member.

SUMMARY OF THE INVENTION

An object of the invention is to overcome the above mentioned limitations. The fuel vent valve of the present invention is not shut improperly by the flow of fuel vapor. Also, there is no need to set the load of a spring. The present invention also prevents fuel from spilling out from fill opening during filling of the fuel tank.

Basically, the invention is a fuel vent valve formed at an upper portion of a fuel tank for permitting and cutting off communication between an inside and an outside of the fuel tank. A casing includes a vent space for connecting the inside and outside of the fuel tank. A communication passage is formed on an upper portion of the casing, and the communication passage communicates an inside of the vent space with an outside of the vent space. A valve device, which includes a float, is in the vent space and rises and falls in response to the fuel level in the fuel tank. The valve device includes an upper valve member, which is allowed to move up and down above an upper portion of the float, and the upper valve member shuts and opens the communication passage. The upper valve member shuts the communication passage when the fuel level reaches a certain level. A breathing hole connects the inside of the fuel tank with the communication passage. A regulated passage is formed by the breathing hole and the valve device. The regulated passage varies the flow resistance of fuel vapor between the fuel tank and the communication passage to reduce the fuel vapor flow to the outside of the fuel tank when the fuel level reaches a predetermined level.

BRIEF DESCRIPTION OF THE DRAWINGS

The accompanying figures, in which like reference numerals refer to identical or functionally similar elements throughout the separate views and which, together with the detailed description below, are incorporated in and form part of the specification, serve to further illustrate various embodiments and to explain various principles and advantages all in accordance with the present invention.

DETAILED DESCRIPTION OF THE PREFERRED EMBODIMENTS

First Embodiment

Figure 1:
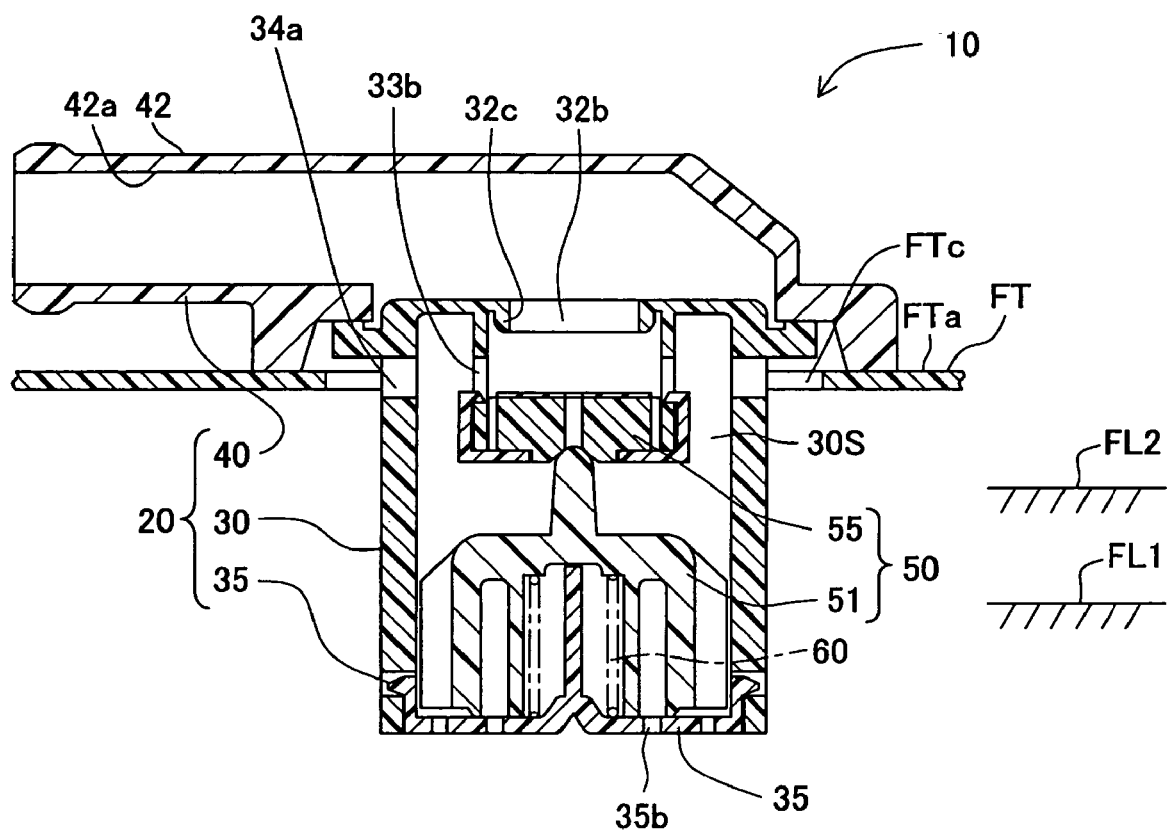
FIG. 1 is a cross sectional view of the first embodiment of a fuel vent valve disposed on the upper of a fuel tank of a vehicle.

Referring to FIG. 1, a fuel tank FT is made of synthetic resin material containing polyethylene at the surface, a mounting hole FTc is formed at a tank upper wall FTa. A fuel vent valve 10 is inserted into the mounting hole FTc at the tank upper wall FTa. The fuel vent valve 10 is essentially closed with only a small amount of flow passing through it when the fuel level in the fuel tank FT reaches a first predetermined level (a predetermined level) FL1. The fuel vent valve 10 is closed fully when the fuel level in the fuel tank FT reaches a second predetermined level (a certain level) FL2. Thus the fuel vent valve 10 controls the flow of fuel vapor to a canister (not shown).

The fuel vent valve 10 will now be described with regard to its construction and function. The fuel vent valve 10 includes a casing 20, a valve device 50 and a spring 60.

The casing 20 includes a casing body 30, a bottom plate 35 and a cover 40. The casing body 30 and the bottom plate 35 form a vent space 30S.

Figure 2:
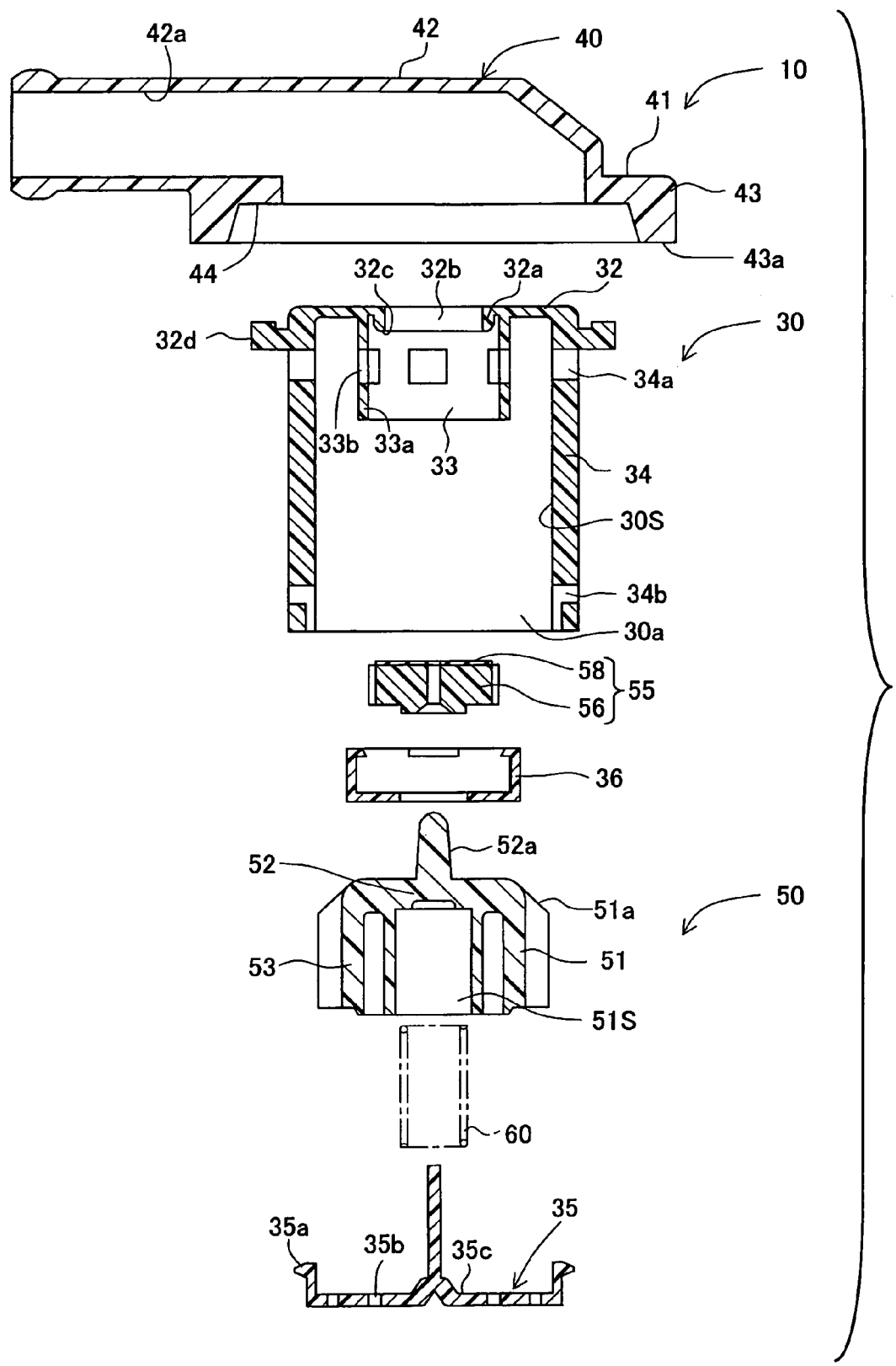
FIG. 2 is an exploded cross sectional view of the fuel vent valve.

Referring to FIG. 2, the casing body 30 includes an upper wall 32, a supporting protrusion (a valve supporting member) 33, which extends downwardly from the upper wall 32, and a cylindrical outer wall 34, which extends downwardly from the peripheral portion of the upper wall 32. The vent space 30S is formed in cup shape by the upper wall 32 and the cylindrical outer wall 34 and opens at the lower portion of vent space 30S. An upper protrusion 32a is cylindrical and is formed at the center of the upper wall 32. A communication passage 32b extends through the upper protrusion 32a. The lower edge of the upper protrusion 32a serves as a first seal portion 32c.

Figure 3:
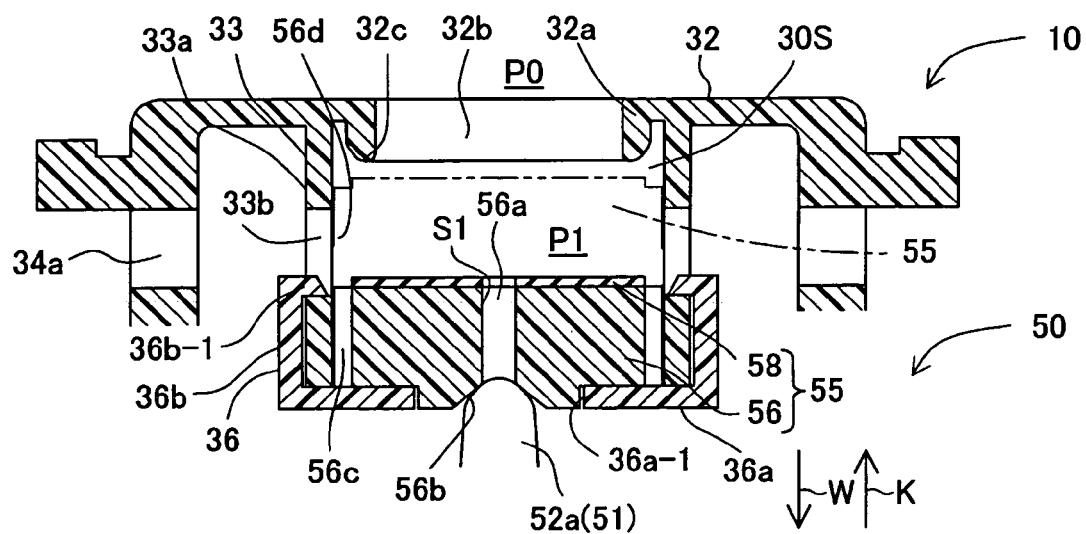
FIG. 3 is a enlarged cross sectional view of the upper portion of the fuel vent valve.

Referring to FIG. 3, the supporting protrusion 33 includes a cylindrical support body 33a, and four breathing holes 33b are formed at even intervals on the circumference of the cylindrical support body 33a. The supporting protrusion 33 holds a valve supporter 36, which supports one part of the valve device 50. The valve supporter 36 is cup-shaped with a bottom wall 36a and a side wall 36b. The bottom wall 36a includes a through hole 36a-1, and the side wall 36b includes a locking pawl 36b-1 at the upper edge of the side wall 36b. The locking pawl 36b-1 engages the lower edge of the breathing hole 33b of the supporting protrusion 33. Thus the locking pawl 36b-1 secures the valve supporter 36 to the supporting protrusion 33.

Now referring to FIG. 2 again, four communication holes 34a are formed at even intervals on the circumference of the cylindrical outer wall 34 corresponding to the breathing hole 33b. The communication hole 34a communicates with the fuel tank FT and the vent space 30S. An engaging hole 34b is formed at the lower portion of the cylindrical outer wall 34. The engaging hole 34b is for fixing the bottom plate 35 as described later.

The bottom plate 35 closes a bottom opening 30a of the casing body 30. An engaging pawl 35a, which is formed at the periphery of the bottom plate 35, engages the engaging hole 34b, thus the bottom plate 35 is held to the casing body 30. The bottom plate 35 includes a communication path 35b, which connects the fuel tank FT to the vent space 30S. A spring supporter 35c is formed on the upper surface of the bottom plate 35. The spring 60 is supported by the spring supporter 35c and a lower surface of a float 51.

The cover 40 includes a cover body 41, an L-shaped duct 42 extending upward from the center of the cover body 41, a flange 43 formed on the periphery of the cover body 41, and a welding surface 44 formed on the lower surface of the cover body 41. The L-shaped duct 42 includes a duct passage 42a, which connects the communication passage 32b of the casing body 30 and the canister (not shown). An annular welding portion 43a is formed on the lower edge of the flange 43 in order to weld the cover 40 to the tank upper wall FTa. The welding surface 44 is made of polyethylene denatured by maleic acid to facilitate welding of the cover 40 to a flange 32d of the casing body 30. The denatured polyethylene can be welded onto both polyacetal and polyethylene, thus the cover 40 can be welded onto the casing body 30.

The valve device 50 includes the float 51, an upper valve member 55, which is located above the float 51. The float 51 also includes an upper wall 52 and a cylindrical outer wall 53, which extends downward from the periphery of the upper wall 52. The inside of the cylindrical outer wall 53 makes a buoyancy space 51S which gives buoyancy to the float 51. Eight guide fins 51a are formed on the periphery of the float 51. The guide fins 51a are rib-shaped and are located at even intervals on the circumference of the cylindrical outer wall 53 of the float 51. A valve portion 52a is formed on the center of the upper wall 52.

As shown in FIG. 3, the upper valve member 55, which is retained by the valve supporter 36, is moveable vertically. The upper valve member 55 is located above the float 51 and includes a valve body 56, which is disc-like, and a seat member 58 fixed on the upper surface of the valve body 56. A flow passage 56a of the valve body 56 is formed to extend through the center of the valve body 56. The flow passage 56a is opened and shut by a valve portion 52a of the float 51. A portion of valve body 56 at the lower end of the flow passage 56a serves as a second seal portion 56b. Eight guide fins 56c are radially formed on the periphery of the valve body 56. The guide fins 56c prevent the valve body 56 from becoming misaligned with the supporting protrusion 33. Also, the guide fins 56c prevent the valve body 56 from tilting in the supporting protrusion 33. When the upper valve member 55 rises to an upper position (shown by a dotted line), the guide fins 56c and the inside wall of the supporting protrusion 33 form a breathing passage 56d, which communicates with the breathing hole 33b and the communication passage 32b. The breathing passage 56d and the breathing hole 33b form a regulated passage that restricts the flow of fuel vapor. The seat member 58 opens and closes the communication passage 32b by contacting the first seal portion 32c.

Figure 4:
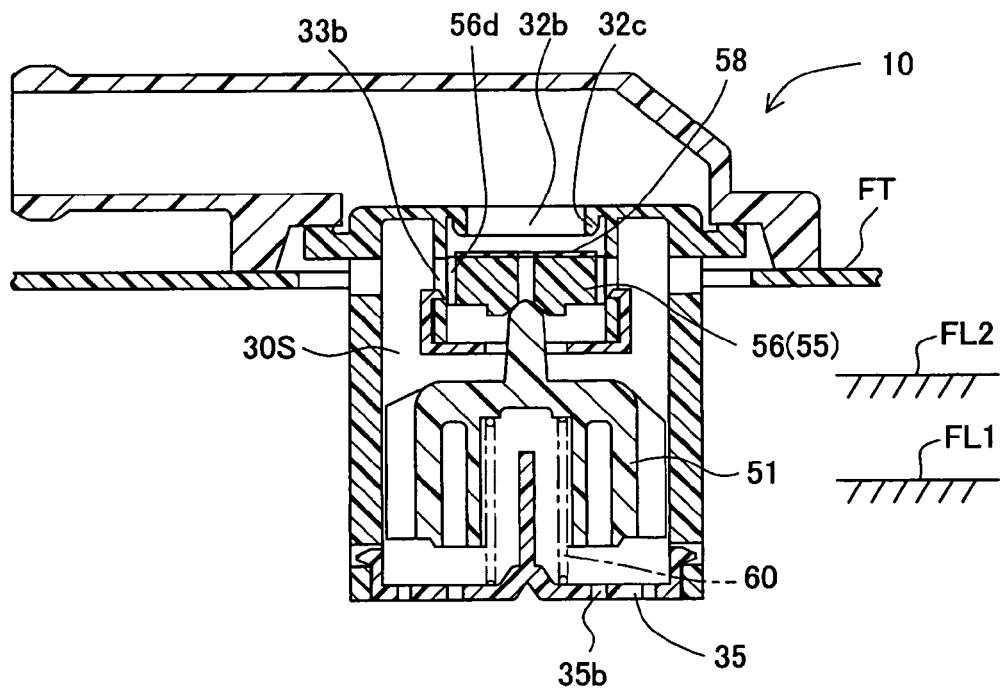
FIGS. 4, 5, and 6 are a cross sectional views for illustrating movement of the fuel vent valve.

The motions of the fuel vent valve will now be described. Referring to FIG. 1, when fuel is fed into the fuel tank FT from a fuel feeder and the fuel level in the fuel tank FT rises, a fuel vapor pooled in the upper space of the fuel tank FT flows into the vent space 30S through the communication hole 34a, the breathing hole 33b and the communication path 35b. Then fuel vapor flows into the canister through the communication passage 32b and the duct passage 42a from the vent space 30S. As shown FIG. 4, when the fuel level in the fuel tank FT reaches a first predetermined level FL1, the fuel flows into the vent space 30S through the communication path 35b of the bottom plate 35. Thus, when an upward force caused by the buoyancy of the float 51 and the force of the spring 61 exceeds a downward force of the weight of the float 51 and the upper valve member 55, the float 51 and the upper valve member 55 rise. When the side wall of the valve body 56 of the upper valve member 55 covers the breathing hole 33b, the air-flow resistance at the breathing hole 33b increases.

Then, because the seat member 58 doesn't yet touch the first seal portion 32c, the fuel tank FT communicates with the canister through the communication passage 32b. Because the breathing hole 33b is restricted by the valve body 56, the internal pressure of the fuel tank FT increases. When a fuel filler detects the increased pressure of the fuel tank FT, an auto stop function of the fuel filler stops the delivery of fuel. Thus, when the fuel level in the fuel tank FT reaches the first predetermined level FL1, the communication passage 32b is not shut completely. However, the upper valve member 55 restricts flow through the breathing hole 33b to reduce the flow of fuel vapor. Therefore, the inside pressure of the fuel tank FT does not increase drastically, and spilling of fuel from the fill opening does not occur.

Figure 5:
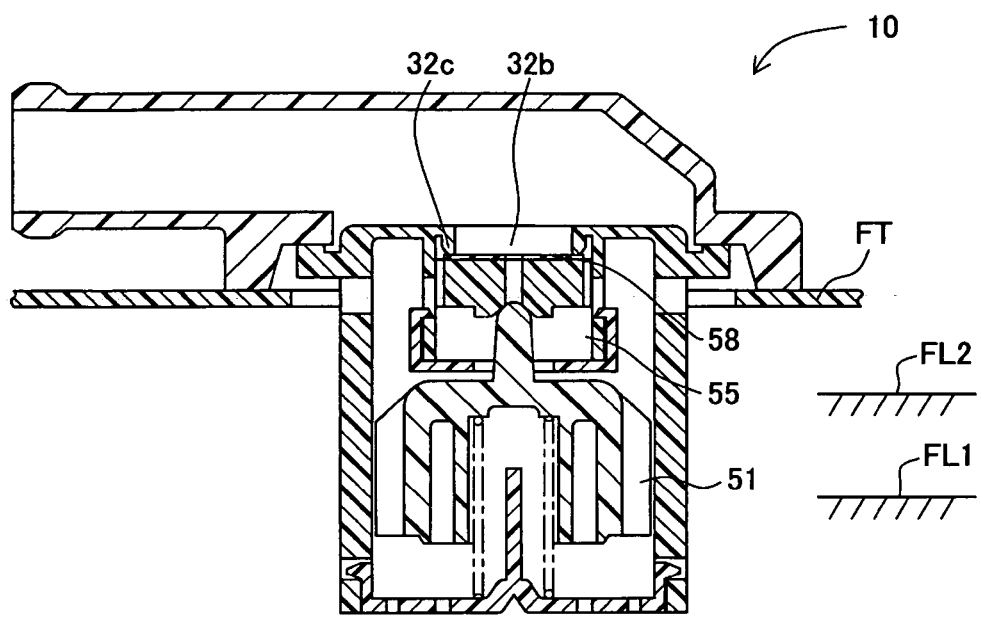

As shown in FIG. 5, if a person adds more fuel to the fuel tank after the fuel filler has been stopped, when the fuel level reaches a second predetermined level FL2, the float 51 and the upper valve member 55 rise due to the increased buoyancy of the float 51. Then the seat member 58 contacts the first seal portion 32c and shuts the communication passage 32b. Therefore, because the fuel tank FT is closed to the canister, the internal pressure of the fuel tank FT increases and fuel delivery to the tank is stopped again.

Figure 6:
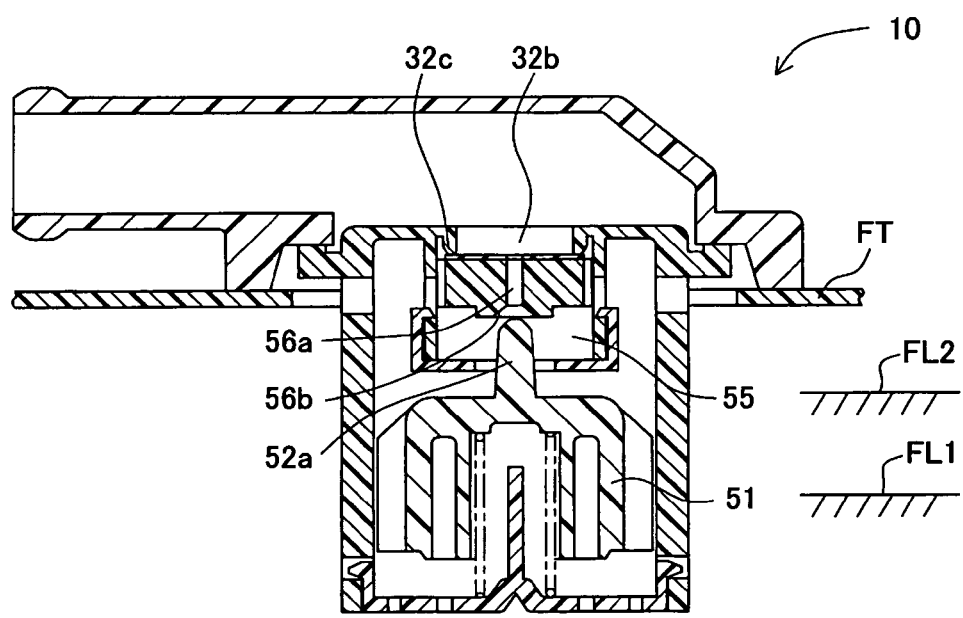

On the other hand, as shown in FIG. 6, when the fuel level falls due to fuel consumption, the float 51 drops correspondingly and the valve portion 52a opens the flow passage 56a of the valve body 56 by separating from the second seal portion 56b. Then, because the size of the flow passage 56a of the valve body 56 is small, as described below, the float 51 can fall smoothly and open the flow passage 56a of the valve body 56. The pressure below the upper valve member 55 (the fuel tank FT side) equals the pressure around the communication passage 32b (the canister side) when the flow passage 56a of the valve body 56 opens. The force pushing the upper valve member 55 toward the first seal portion 32c is weakened by reducing the difference between the pressure below the upper valve member 55 and that above the upper valve member 55 around the communication passage 32b. The upper valve member 55 smoothly falls under its own weight. Thus, the upper valve member 55 improves the performance of the valve reopening and the upper valve member 55 reopens the float 51 smoothly.

The reason that the performance of the valve reopening is good will be described. Referring to FIG. 3, the area S1 of the flow passage 32b of the valve body 56, the pressure at the fuel tank side P1, the pressure at the canister side P0, the upward force K of the spring 60, the weight W of the float 51 satisfy the following inequality (1):

$$(P1-P0)S1 \leq W-K \quad (1)$$

The right side of the inequality (1) is always a positive value that is the difference between the weight W and the upward load K. In other words, this is a constant force urging the float 51 to open the flow passage 56a of the valve body 55. The left side of the inequality (1) is the force urging the valve portion 52a of the float 51 to shut the flow passage 56a by pushing the valve portion 52a toward the second seal portion 56b. When the area of the flow passage S1 is small, the flow passage 56a is opened even though the difference of the pressure (P1−P0) is large. Assuming the pressure at the canister side P0 to be constant, the flow passage is opened although the pressure at the fuel tank side P1 is large. Therefore, the valve reopening performs well because the area S1 of the flow passage 56a of the valve body 56 is relatively smaller than that of the communication passage 32b.

The present invention includes the following advantageous effects. The upper valve member 55 is not urged to close the communication passage 32b during tank filling. When the fuel level in the fuel tank FT rises, the upward force caused by the flow of the fuel vapor does not close the communication passage 32b because the breathing hole 33b is formed at an upper position near the upper face of the upper valve member 55. Thus, the upper valve member 55 can keep the communication passage 32b open even when the upward flow of fuel vapor is strong.

The flow passage 56a of the upper valve member 55 is not used for conducting fuel vapor of the fuel tank FT during tank filling. Because the flow passage 56a is only used for reopening the upper valve member 55, the area of the flow passage 56a of the valve body 56 can be narrower than that of the communication passage 32b for improving the performance of valve reopening.

As illustrated by the above mentioned inequality (1), because the area S1 of the flow passage 56a of the upper valve member 55 is small, weight saving and miniaturization of the float 51 can be realized without reducing the performance of valve reopening. Therefore, cost reduction and the miniaturization of the fuel vent valve 10 can be accomplished.

Second Embodiment

Figure 7:
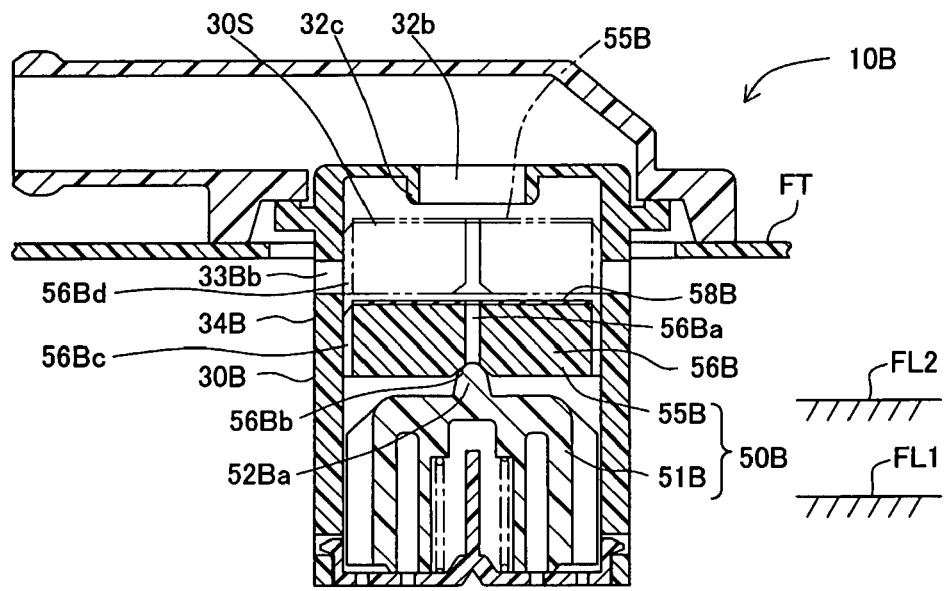
FIG. 7 is a cross sectional view of a second embodiment of the fuel vent valve.

Referring to FIG. 7, in the second embodiment, the structure of a valve device 50B supporting an upper valve member 55B at the upper portion of a float 51B differs from the first embodiment. The valve device 50B includes the float 51B and an upper valve member 55B supported at the upper portion of the float 51B and at a casing body (a valve supporting member) 30B. The upper valve member 55B includes a cylindrical valve body 56B and a rubber seat member 58B formed on the upper surface of the valve body 56B. Eight guide fins 56Bc are formed radially on the periphery of the valve body 56B. The guide fins 56Bc serve to prevent the upper valve member 55B from becoming misaligned with the inside of a cylindrical outer wall 34B. The cylindrical outer wall 34B includes a breathing hole 33Bb. A breathing passage 56Bd formed by the guide fins 56Bc and the cylindrical outer wall 34B communicates with the breathing hole 33Bb. The breathing passage 56Bd and the breathing hole 33Bb form a regulated passage that restricts the flow of fuel vapor. A flow passage 56Ba is formed along the center axis of the valve body 56B. A valve portion 52Ba of the float 51B contacts a second seal portion 56Bb, which is located at the periphery of the lower end of the flow passage 56Ba. When the valve portion 52Ba contacts the second seal portion 56Bb, the valve body 56B is supported by the float 51B.

The motions of the fuel vent valve in the second embodiment will now be described. When the fuel level in the vent space 30S reaches a predetermined fuel level FL1, the upper valve member 55B and the float 51B rise together. When the side wall of the upper valve member 55B rises and covers the breathing hole 33Bb, the flow resistance of the regulated passage increases. Because the area of the breathing passage 56Bd between the outer wall of the upper valve member 55B and the cylindrical outer wall 34B is restricted, the internal pressure of the fuel tank FT increases. When the fuel level in the vent space 30S reaches a predetermined fuel level FL2, the float 51B rises due to buoyancy and the seat member 58B of the upper valve member 55B shuts the communication passage 32B by contacting a first seal portion 32c. Thus, the fuel tank FT is closed to the canister. When the fuel level falls due to fuel consumption, the float 51B drops accordingly. Then the valve portion 52Ba separates from the second seal portion 56Bb and the seat member 58B separates from the first seal portion 32c, and the communication passage 32b is opened. In the second embodiment, as in the first embodiment, because the area of the flow passage 56Ba of the valve body 56B is narrower than that of the communication passage 32b, the valve reopening performance is good.

According to the second embodiment, because the upper portion of the float 51B supports the upper valve member 55B, the construction of the casing body (the valve supporting member) 30B of the second embodiment is simpler than that of the first embodiment.

Third Embodiment

Figure 8:
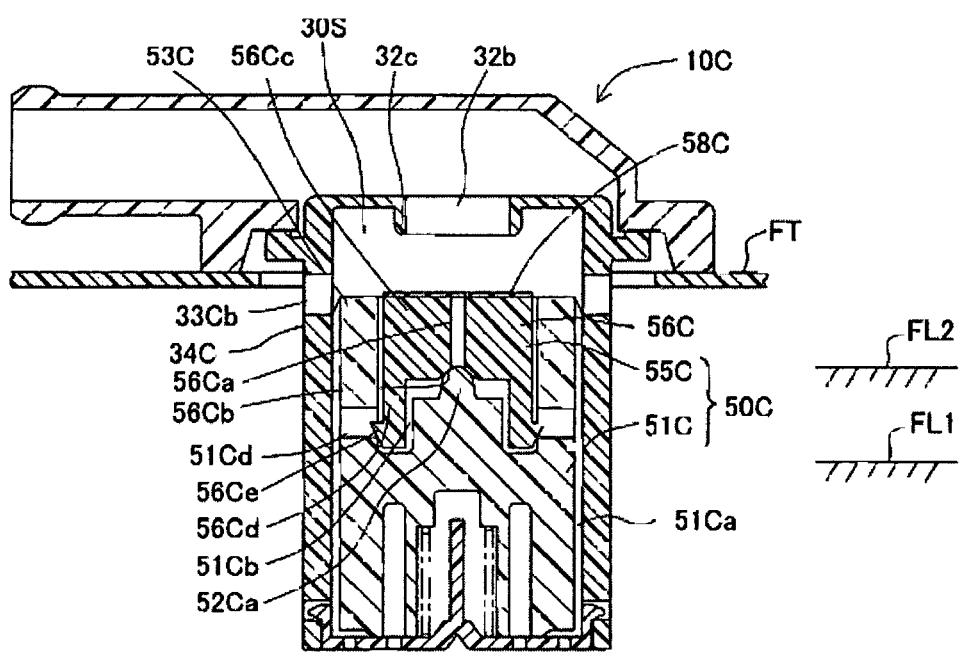
FIG. 8 is a cross sectional view of a third embodiment of the fuel vent valve.

Referring to FIG. 8, in a third embodiment, the structure of a regulated passage including a breathing hole 33Cb, which is restricted by a cylindrical outer wall 53C of a float 51C, differs from the first and second embodiment. A valve device 50C includes a float 51C and an upper valve member 55C, which can be moved up and down, located on an upper portion of the float 51C. Guide fins 51Ca are formed on the cylindrical outer wall 53C. A casing body (a valve supporting member) 30C supports the valve device 50C. The cylindrical outer wall 53C restricts the breathing hole 33Cb when the float 51C rises.

The upper valve member 55C includes a valve body 56C and a rubber seat member 58C formed on the upper surface of the valve body 56C. A flow passage 56Ca of the valve body 56C is formed in the center of the valve body 56C. A valve portion 52Ca of the float 51C contacts a second seal portion 56Cb, which is located at the periphery of the lower opening of the flow passage 56Ca.

A structure that supports the upper valve member 55C is formed on the upper portion of the float 51C. The valve body 56C includes leg portions 56Cd, which extend downward from the lower surface of a disc shaped upper wall 56Cc. The leg portions 56Cd of the valve body 56C include a pawl 56Ce at the lower end thereof. An annular recess 51Cb is formed at the upper portion of the float 51C. Engaging holes 51Cd are formed on an outer wall that defines the annular recess 51Cb. Pawls 56Ce of the valve body 56C engage the engaging holes 51Cd to secure the valve body 56C to the flat 51C.

The motions of the fuel vent valve in the third embodiment will now be described. When the fuel level in the vent space 30S reaches a predetermined fuel level FL1, the upper valve member 55C and the float 51C rise together. When the cylindrical outer wall 53C of the float 51C rises and covers the breathing hole 33Cb, the flow resistance of the regulated passage increases. Because the area of the breathing hole 33Cb is restricted by the float 51C, the internal pressure of the fuel tank FT rises. When the fuel level in the vent space 30S reaches a predetermined fuel level FL2, the float 51C rises further due to buoyancy and the seat member 58B of the upper valve member 55B closes the communication passage 32b by contacting a first seal portion 32c. Thus, the fuel tank FT is closed with respect to the canister. When the fuel level falls due to fuel consumption, the float 51C falls accordingly. Then the valve portion 52Ca is separated from the second seal portion 56Cb and the seat member 58C is separated from the first seal portion 32c, and the communication passage 32b is opened. In the third embodiment, as in the first embodiment, because the area of the flow passage 56Ca of the valve body 56C is smaller than that of the communication passage 32b, the valve reopening performance is improved.

In the third embodiment, the flow of fuel vapor doesn't push the upper valve member 55C upward because the flow of fuel vapor is restricted by the cylindrical outer wall 53C of the float 51C. Therefore, the upper valve member 55C is not shut improperly.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiments were chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

The invention claimed is:

1. A fuel vent valve formed at an upper portion of a fuel tank for permitting and cutting off communication between an inside and an outside of the fuel tank, comprising:
    a casing having a vent space for connecting the inside and outside of the fuel tank;
    a communication passage formed on an upper portion of the casing, wherein the communication passage communicates an inside of the vent space with an outside of the vent space;
    a valve device having a float, which is in the vent space and rises and falls in response to the fuel level in the fuel tank, wherein the valve device includes an upper valve member, which is allowed to move up and down above an upper portion of the float, and the upper valve member shuts and opens the communication passage, wherein the upper valve member shuts the communication passage when the fuel level reaches a certain level;
    a regulated passage formed by a breathing hole and the valve device, wherein the breathing hole connects the inside of the fuel tank with the communication passage, and wherein the regulated passage varies the flow resistance of fuel vapor between the fuel tank and the communication passage to reduce the fuel vapor flow to the outside of the fuel tank when the fuel level reaches a predetermined level;
    a supporting protrusion extended toward the vent space from the upper portion of the casing;
    a valve supporter formed at the lower end of the supporting protrusion; wherein the breathing hole is formed on the outer wall of the supporting protrusion, and the valve supporter supports the upper valve member; and
    a communication hole formed in the casing, wherein the communication hole communicates the fuel tank with the vent space.

2. A fuel vent valve according to claim 1, wherein the upper valve member includes a flow passage that is smaller than the communication passage of the casing, and the flow passage connects the communication passage with the vent space, and wherein the float includes a valve portion, which contacts the upper valve member to open and close the flow passage.

3. A fuel vent valve according to claim 1, wherein the breathing hole is formed in an outer wall of the supporting protrusion at the same level as or above an upper surface of the upper valve member when the valve device is not floating, wherein the breathing hole connects the inside of the fuel tank with the communication passage.

4. A fuel vent valve according to claim 1, wherein the upper valve member is supported by the upper portion of the float, and wherein the upper portion of the float pushes the upper valve member upward when the float is floating.

5. A fuel vent valve according to claim 1, wherein a side wall of the upper valve member is located a predetermined distance from the breathing hole to restrict the breathing hole when the upper valve member rises.

6. A fuel vent valve according to claim 5, further comprising guide fins formed on the periphery of the upper valve member to maintain the predetermined distance between the upper valve member and the breathing hole.

7. A fuel vent valve formed at an upper portion of a fuel tank for permitting and cutting off communication between an inside and an outside of the fuel tank, comprising:
    a casing having a vent space for connecting the inside and outside of the fuel tank;
    a communication passage formed on an upper portion of the casing, wherein the communication passage communicates an inside of the vent space with an outside of the vent space;
    a valve device having a float, which is in the vent space and rises and falls in response to the fuel level in the fuel tank, wherein the valve device includes an upper valve member, which is allowed to move up and down above an upper portion of the float, and the upper valve member shuts and opens the communication passage, wherein the upper valve member shuts the communication passage when the fuel level reaches a certain level; and
    a regulated passage formed by a breathing hole and the upper valve member, wherein the breathing hole connects the inside of the fuel tank with the communication passage, and wherein the regulated passage varies the flow resistance of fuel vapor between the fuel tank and the communication passage to reduce the fuel vapor flow to the outside of the fuel tank when the fuel level reaches a predetermined level, wherein the upper valve member restricts the breathing hole to regulate the fuel vapor flow when the upper valve member rises.

8. A fuel vent valve according to claim 7, wherein the upper valve member includes a flow passage that is smaller than the communication passage of the casing, wherein the flow passage connects the communication passage with the vent space, and the float includes a valve portion, which contacts the upper valve member to open and close the flow passage.

9. A fuel vent valve according to claim 7, wherein the breathing hole is formed in an outer wall of the casing at the same level as or above an upper surface of the upper valve member when the valve device is not floating, wherein the breathing hole connects the inside of the fuel tank with the communication passage.

10. A fuel vent valve according to claim 7, wherein the upper valve member is supported by the upper portion of the float, and wherein the upper portion of the float pushes the upper valve member upward when the float is floating.

11. A fuel vent valve according to claim 7, further comprising guide fins formed on the outer periphery of the upper valve member to maintain the predetermined distance between the upper valve member and the breathing hole.

12. A fuel vent valve formed at an upper portion of a fuel tank for permitting and cutting off communication between an inside and an outside of the fuel tank, comprising:
 a casing having a vent space for connecting the inside and outside of the fuel tank;
 a communication passage formed on an upper portion of the casing, wherein the communication passage communicates an inside of the vent space with an outside of the vent space;
 a valve device having a float, which is in the vent space and rises and falls in response to the fuel level in the fuel tank, wherein the valve device includes an upper valve member, which is allowed to move up and down above an upper portion of the float, and the upper valve member shuts and opens the communication passage, wherein the upper valve member shuts the communication passage when the fuel level reaches a certain level; and
 a regulated passage formed by a breathing hole and the float, wherein the breathing hole connects the inside of the fuel tank with the communication passage, and wherein the regulated passage varies the flow resistance of fuel vapor between the fuel tank and the communication passage to reduce the fuel vapor flow to the outside of the fuel tank when the fuel level reaches a predetermined level, wherein the float restricts the breathing hole to regulate fuel vapor flow when the float rises.

13. A fuel vent valve according to claim 12, wherein the upper valve member includes a flow passage that is smaller than the communication passage of the casing, and the flow passage connects the communication passage with the vent space, and wherein the float includes a valve portion, which contacts the upper valve member to open and close the flow passage.

14. A fuel vent valve according to claim 12, wherein the breathing hole is formed in an outer wall of the casing at the same level as or above an upper surface of the float when the valve device is not floating, wherein the breathing hole connects the inside of the fuel tank with the communication passage.

15. A fuel vent valve according to claim 12, wherein the upper valve member is supported by the upper portion of the float, and wherein the upper portion of the float pushes the upper valve member upward when the float is floating.

16. A fuel vent valve according to claim 12, further comprising guide fins formed on the outer periphery of the float to maintain the predetermined distance between the float and the breathing hole.

* * * * *